(12) United States Patent
Zhang et al.

(10) Patent No.: US 12,470,721 B2
(45) Date of Patent: Nov. 11, 2025

(54) POINT CLOUD ENCODING PROCESSING METHOD AND APPARATUS AND POINT CLOUD DECODING PROCESSING METHOD AND APPARATUS

(71) Applicant: VIVO MOBILE COMMUNICATION CO., LTD., Guangdong (CN)

(72) Inventors: Wei Zhang, Guangdong (CN); Tengya Tian, Guangdong (CN); Zhuoyi Lv, Guangdong (CN); Fuzheng Yang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 83 days.

(21) Appl. No.: 18/511,099

(22) Filed: Nov. 16, 2023

(65) Prior Publication Data

US 2024/0089459 A1   Mar. 14, 2024

Related U.S. Application Data

(63) Continuation of application No. PCT/CN2022/097853, filed on Jun. 9, 2022.

(30) Foreign Application Priority Data

Jun. 11, 2021   (CN) .......................... 202110656048.8

(51) Int. Cl.
  *H04N 19/14*   (2014.01)
  *H04N 19/174*   (2014.01)
  *H04N 19/70*   (2014.01)

(52) U.S. Cl.
  CPC ........... *H04N 19/14* (2014.11); *H04N 19/174* (2014.11); *H04N 19/70* (2014.11)

(58) Field of Classification Search
  None
  See application file for complete search history.

(56) References Cited

U.S. PATENT DOCUMENTS

2018/0278956 A1   9/2018   Toma et al.
2020/0349742 A1   11/2020   Wang et al.
(Continued)

FOREIGN PATENT DOCUMENTS

CN   111615791 A   9/2020
CN   112313711 A   2/2021
(Continued)

OTHER PUBLICATIONS

Blackberry, "[PCC] Inference of a mode using point location direct coding in TMC3", International Organisation for Standardisation, ISO/IEC JTC1/SC29/WG11 MPEG2018/m42239, Jan. 2018, Gwangju, Korea.
(Continued)

*Primary Examiner* — Christopher Braniff
(74) *Attorney, Agent, or Firm* — Price Heneveld LLP (57) ABSTRACT

This application discloses a point cloud encoding processing method and apparatus and a point cloud decoding processing method and apparatus. The point cloud encoding processing method of embodiments of this application includes: determining sparsity level information of a target point cloud; and in a case that the sparsity level information indicates the target point cloud being a sparse point cloud and a node to be encoded corresponding to the target point cloud satisfies an isolated point encoding condition, enabling an isolated point encoding mode.

20 Claims, 4 Drawing Sheets

(56) References Cited

U.S. PATENT DOCUMENTS

| | | |
|---|---|---|
| 2020/0396489 A1 | 12/2020 | Flynn et al. |
| 2021/0105505 A1 | 4/2021 | Sugio |
| 2021/0142521 A1* | 5/2021 | Iguchi .................... H04N 19/70 |
| 2022/0191520 A1 | 6/2022 | Kato et al. |
| 2022/0353492 A1 | 11/2022 | Yano et al. |
| 2023/0046917 A1* | 2/2023 | Flynn .................... H04N 19/96 |

FOREIGN PATENT DOCUMENTS

| | | |
|---|---|---|
| CN | 112514397 A | 3/2021 |
| CN | 112565794 A | 3/2021 |
| EP | 3514969 A1 | 7/2019 |
| WO | 2017104115 A1 | 6/2017 |
| WO | 2019142834 A1 | 7/2019 |
| WO | 2020189296 A1 | 9/2020 |
| WO | 2020189891 A1 | 9/2020 |
| WO | 2020262019 A1 | 12/2020 |

OTHER PUBLICATIONS

3DG, "G-PCC codec description v2", International Organisation for Standardisation, ISO/IEC JTC1/SC29/WG11 N18189, Jan. 2019, Marrakech, MA.

* cited by examiner

POINT CLOUD ENCODING PROCESSING METHOD AND APPARATUS AND POINT CLOUD DECODING PROCESSING METHOD AND APPARATUS

CROSS-REFERENCE TO RELATED APPLICATIONS

This application is a continuation application of International Application No. PCT/CN2022/097853, filed on Jun. 9, 2022. International Application No. PCT/CN2022/097853 claims priority to Chinese Patent Application No. 202110656048.8, filed in China on Jun. 11, 2021. Each of the above-listed applications is incorporated herein by reference in its entirety.

TECHNICAL FIELD

The present invention relates to the field of point cloud processing technologies, and in particular, to a point cloud encoding processing method and apparatus and a point cloud decoding processing method and apparatus.

BACKGROUND

In point cloud reference software model (PCRM) V3.0 of the digital audio video coding standard (AVS), when certain conditions are met, the encoding process directly enters an isolated point encoding mode. Specifically, when an isolated point encoding mode indicator in geometric header information is set to 1, the sum of Morton code bits to be encoded for points within the current node is greater than twice the sum of the minimum edge lengths in each dimension of the current code, and there is only one point within the current node, the isolated point flag (singlePointFlag) is set to 1, indicating direct entry to the isolated point encoding mode. For dense point clouds, nodes with only one point are rare. bitstreams with a large number of singlePointFlags encoded with a value of 0 do not contribute to the compression of the point cloud, resulting in decreased performance.

SUMMARY

According to a first aspect, a point cloud encoding processing method is provided, including:
  determining sparsity level information of a target point cloud; and
  in a case that the sparsity level information indicates the target point cloud being a sparse point cloud and a node to be encoded corresponding to the target point cloud satisfies an isolated point encoding condition, enabling an isolated point encoding mode.

According to a second aspect, a point cloud decoding processing method is provided, including:
  determining sparsity level information of a target point cloud; and
  in a case that the sparsity level information indicates the target point cloud being a sparse point cloud and a node to be decoded corresponding to the target point cloud satisfies an isolated point decoding condition, enabling an isolated point decoding mode.

According to a third aspect, a point cloud encoding processing apparatus is provided, including:
  a first determining module, configured to determine sparsity level information of a target point cloud; and
  a first processing module, configured to enable an isolated point encoding mode in a case that the sparsity level information indicates the target point cloud being a sparse point cloud and a node to be encoded corresponding to the target point cloud satisfies an isolated point encoding condition.

According to a fourth aspect, a point cloud decoding processing apparatus is provided, including:
  a second determining module, configured to determine sparsity level information of a target point cloud; and
  a second processing module, configured to enable an isolated point decoding mode in a case that the sparsity level information indicates the target point cloud being a sparse point cloud and a node to be decoded corresponding to the target point cloud satisfies an isolated point decoding condition.

According to a fifth aspect, a point cloud encoding processing apparatus is provided, including a processor, a memory, and a program or instructions stored in the memory and capable of running on the processor, and when the program or instructions are executed by the processor, the steps of the method according to the first aspect are implemented.

According to a sixth aspect, a point cloud encoding processing apparatus is provided, including a processor and a communication interface, where the processor is configured to determine sparsity level information of a target point cloud; and in a case that the sparsity level information indicates the target point cloud being a sparse point cloud and a node to be encoded corresponding to the target point cloud satisfies an isolated point encoding condition, an isolated point encoding mode is enabled.

According to a seventh aspect, a point cloud decoding processing apparatus is provided, including a processor, a memory, and a program or instructions stored in the memory and capable of running on the processor, and when the program or instructions are executed by the processor, the steps of the method according to the second aspect are implemented.

According to an eighth aspect, a point cloud decoding processing apparatus is provided, including a processor and a communication interface, where the processor is configured to determine sparsity level information of a target point cloud; and in a case that the sparsity level information indicates the target point cloud being a sparse point cloud and a node to be decoded corresponding to the target point cloud satisfies an isolated point decoding condition, an isolated point decoding mode is enabled.

According to a ninth aspect, a readable storage medium is provided, where a program or instructions are stored in the readable storage medium, and when the program or the instructions are executed by a processor, the steps of the method according to the first aspect are implemented, or the steps of the method according to the second aspect are implemented.

According to a tenth aspect, a chip is provided, where the chip includes a processor and a communication interface, the communication interface is coupled to the processor, and the processor is configured to run a program or instructions to implement the method according to the first aspect or the method according to the second aspect.

According to an eleventh aspect, a computer program product is provided, where the computer program product is stored in a non-transit storage medium, and the computer program product is executed by at least one processor to implement the steps of the method according to the first or the second aspect.

DESCRIPTION OF EMBODIMENTS

The following clearly describes the technical solutions in the embodiments of this application with reference to the accompanying drawings in the embodiments of this application. Apparently, the described embodiments are only some rather than all of the embodiments of this application. All other embodiments obtained by persons of ordinary skill in the art based on the embodiments of this application shall fall within the protection scope of this application.

The terms "first", "second", and the like in this specification and claims of this application are used to distinguish between similar objects rather than to describe a specific order or sequence. It should be understood that the data used in such a way is interchangeable in appropriate circumstances so that the embodiments of this application can be implemented in other orders than the order illustrated or described herein. Moreover, the objects distinguished by "first" and "second" are usually of one type, and the number of objects is not limited. For example, the first object may be one or more than one. In addition, "and/or" in the specification and claims represents at least one of connected objects, and the character "/" generally indicates that the associated objects have an "or" relationship.

The encoder corresponding to the point cloud encoding method and the decoder corresponding to the point cloud decoding method in the embodiments of this application may both be terminals. The terminal may also be referred to as a terminal device or user equipment (UE), and the terminal may be a terminal-side device, such as a mobile phone, a tablet computer (Tablet Personal Computer), a laptop computer or a notebook computer, a personal digital assistant (PDA), a palmtop computer, a netbook, an ultra-mobile personal computer (UMPC), a mobile Internet device (MID), an augmented reality (AR)/virtual reality (VR) device, a robot, a wearable device, vehicle user equipment (VUE), or pedestrian user equipment (PUE). The wearable device includes: a smart watch, a wrist band, earphones, glasses, or the like. It should be noted that a specific type of the terminal is not limited in the embodiments of this application.

To enable persons skilled in the art to better understand the embodiments of this application, the following description on the AVS codec framework is provided.

Figure 1:
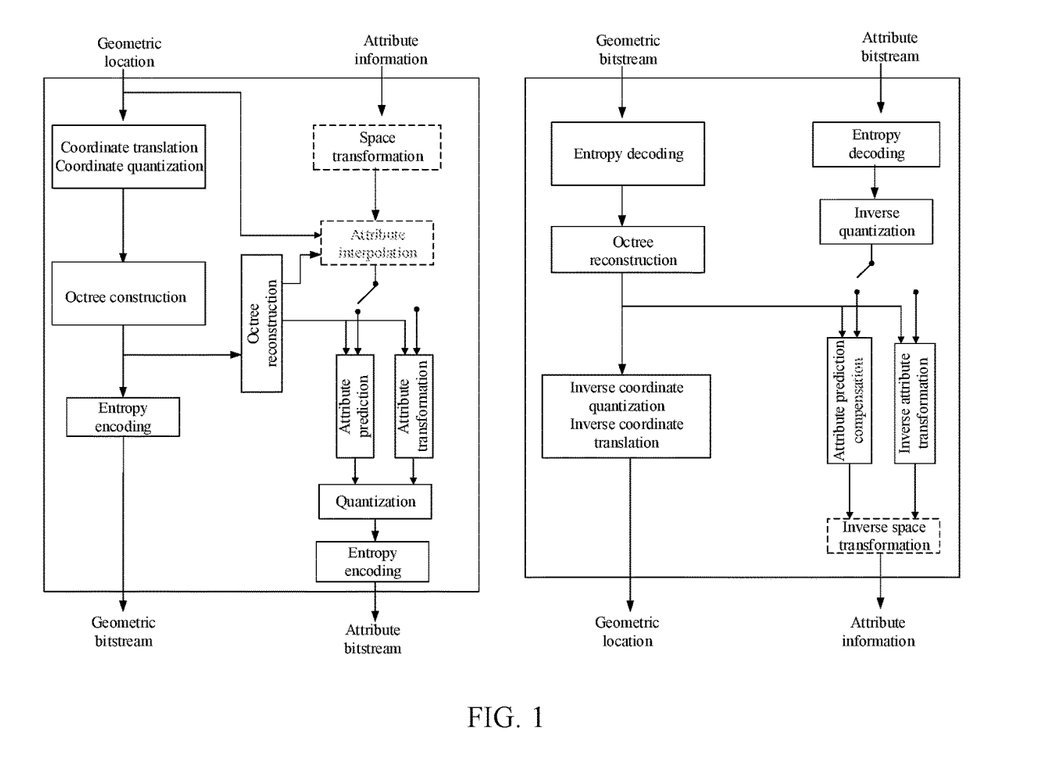
FIG. 1 is a schematic structural diagram of a framework of a point cloud AVS encoder.

As shown in FIG. 1, in the point cloud AVS encoder framework, the geometric information of the point cloud and the attribute information corresponding to each point are encoded separately. Coordinate transformation is first performed on the geometric information so that the entire point cloud is contained in a bounding box. Next, quantization is performed. This quantization step mainly plays a role of scaling. Due to rounding in quantization, some points have the same geometric information. Whether duplicate points are removed is determined according to a parameter. The process of quantization and removal of duplicate points belongs to the preprocessing process. Then, in a breadth-first traversal order, the bounding box is partitioned (by using octree, quadtree, or binary tree), and the occupancy code of each node is encoded. In the octree-based geometric code framework, the bounding box is sequentially partitioned to obtain sub-cubes, and non-empty sub-cubes (containing points in the point cloud) are further partitioned until the resulting leaf nodes are 1×1×1 unit cubes. Then, the number of points contained in each leaf node is encoded, completing the encoding of the geometric octree and generating a binary bitstream. In a geometric decoding process based on octree, the decoding side, in a breadth-first traversal order, obtains the occupancy code of each node through continuous parsing and continues to sequentially partition the nodes until 1×1×1 unit cubes are obtained. Then, the number of points contained in each leaf node is decoded, and geometrically reconstructed point cloud information is finally restored.

After the geometric encoding is completed, the geometric information is reconstructed. At present, attribute encoding mainly focuses on color and reflectance information. First, it is determined whether color space conversion is required. If color space conversion is required, the color information is transformed from the red green blue (RGB) color space to the YUV color space. Then, the reconstructed point cloud is recolored by using the original point cloud so that the uncoded attribute information corresponds to the reconstructed geometric information. There are two modules in color information encoding: attribute prediction and attribute transformation. The attribute prediction process is as follows: first, the point cloud is reordered and then differential prediction is performed. There are two methods of reordering: Morton reordering and Hilbert reordering. For cat1A and cat2 sequences, Hilbert reordering is performed; for cat1B and cat3 sequences, Morton reordering is performed. Attribute prediction is performed on the ordered point cloud by using a differential approach. Finally, the prediction residuals are quantized and entropy-encoded to generate a binary bitstream. The attribute transformation process is as follows: First, wavelet transform is applied on the point cloud attributes, and the transform coefficients are quantized. Then, reconstructed attribute values are obtained through inverse quantization and inverse wavelet transform. Next, the differences between the original attributes and the reconstructed attribute values are calculated to obtain attribute residuals, which are then quantized. Finally, the quantized transform coefficients and attribute residuals are entropy-encoded, generating a binary bitstream.

The following describes in detail a point cloud encoding processing method provided in the embodiments of this application through some embodiments with reference to the accompanying drawings.

Figure 2:
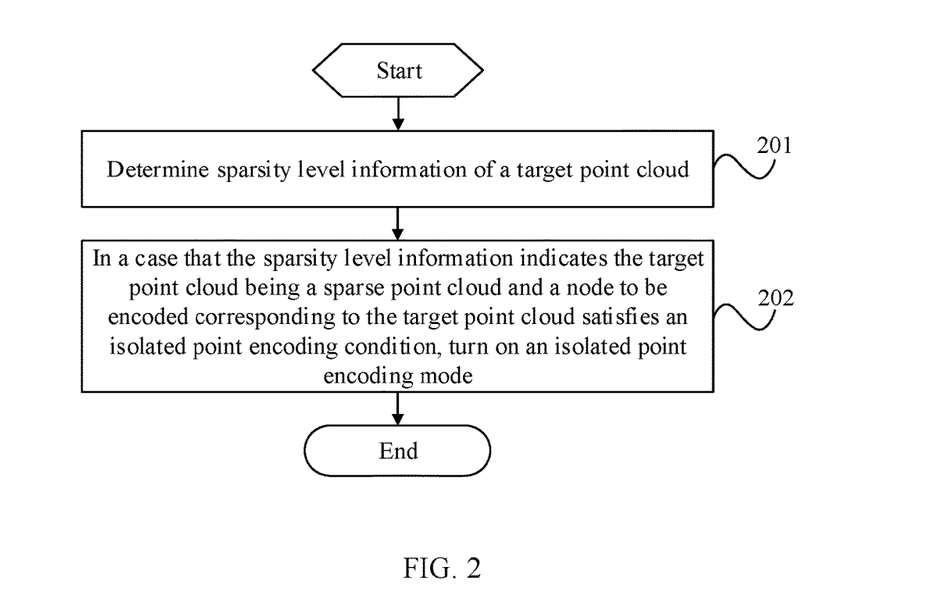
FIG. 2 is a first schematic flowchart of a point cloud encoding processing method according to an embodiment of this application.

As shown in FIG. 2, an embodiment of this application provides a point cloud encoding processing method, including the following steps:

Step 201: Determine sparsity level information of a target point cloud.

In this step, the foregoing target point cloud is a point cloud sequence or a point cloud slice in a point cloud sequence.

Optionally, the foregoing target point cloud refers to a point cloud obtained by pre-processing the target point cloud to be encoded, the pre-processing including at least one of coordinate translation, quantization processing, or removal of duplicate points.

Here, the sparsity level information of the target point cloud is determined so as to facilitate the subsequent determination of whether an isolated point encoding mode is enabled based on the sparsity level information, that is, whether the isolated point encoding mode is enabled is determined by considering the specific characteristics of the target point cloud.

Step 202: In a case that the sparsity level information indicates the target point cloud being a sparse point cloud and a node to be encoded corresponding to the target point cloud satisfies an isolated point encoding condition, enable an isolated point encoding mode.

In an optional implementation, the isolated point encoding condition includes:

An isolated point direct encoding mode indicator in the geometric header information (the target point cloud being a point cloud sequence) or the geometric slice header information (the target point cloud being a point cloud slice) corresponding to the target point cloud is set to a first predetermined value, for example, 1; and a sum of Morton code bits to be encoded for first target points is greater than a second value multiplied by a predetermined factor (for example, 2), where the first target points include points within a spatial block corresponding to the current node being encoded in the target point cloud, the second value is the number of first target edge lengths in the spatial block corresponding to the current node being encoded, the first target edge lengths include edge lengths in a predetermined direction, and the first target edge lengths are smaller than a minimum edge length in the predetermined direction, where the predetermined direction includes at least one of the X direction, Y direction, or Z direction.

For example, in a case that the foregoing sparsity level information indicates that an average occupied volume of each point in the target point cloud is greater than a predetermined threshold, the foregoing target point cloud is determined to be a sparse point cloud, and in a case that it is determined that the target point cloud satisfies the foregoing isolated point encoding condition, the isolated point encoding mode is enabled.

In this implementation, the isolated point encoding mode includes encoding singlePointFlag. For example, if there is only one point within the spatial block corresponding to the current node being encoded, singlePointFlag is set to 1; otherwise, singlePointFlag is set to 0. In a case that singlePointFlag is set to 1, the geometric coordinates of the point in the spatial block corresponding to the current node being encoded are encoded.

In another optional implementation, the isolated point encoding condition includes:

An isolated point direct encoding mode indicator in the geometric header information (the target point cloud being a point cloud sequence) or the geometric slice header information (the target point cloud being a point cloud slice) corresponding to the target point cloud is set to a first predetermined value, for example, 1; and a sum of Morton code bits to be encoded for first target points is greater than a second value multiplied by a predetermined factor (for example, 2), where the first target points include points within a spatial block corresponding to the current node being encoded in the target point cloud, the second value is the number of first target edge lengths in the spatial block corresponding to the current node being encoded, the first target edge lengths include edge lengths in a predetermined direction, and the first target edge lengths are smaller than a minimum edge length in the predetermined direction, where the predetermined direction includes at least one of the X direction, the Y direction, or the Z direction; and there is only one point in the spatial block corresponding to the current node being encoded.

In this implementation, the isolated point encoding mode includes encoding the geometric coordinates of the point within the spatial block corresponding to the current node being encoded.

In the point cloud encoding processing method in this embodiment of this application, sparsity level information of the target point cloud is first determined, and then in a case that the sparsity level information indicates the target point cloud being a sparse point cloud, and the target point cloud satisfies an isolated point encoding condition, an isolated point encoding mode is enabled. In this way, through the foregoing sparsity level information and isolated point encoding condition, nodes that require isolated point encoding can be screened out quickly, thereby encoding performance is guaranteed effectively.

Optionally, the determining sparsity level information of a target point cloud includes:

determining the sparsity level information of the target point cloud based on a target volume corresponding to the target point cloud and the number of target points contained in the target point cloud.

The target volume corresponding to the foregoing target point cloud may be a volume of a spatial block corresponding to the target point cloud, such as a volume of a point cloud slice bounding box.

Here, based on the target volume corresponding to the target point cloud and the number of target points contained in the target point cloud, an average occupied volume of each point in the target point cloud can be obtained. Then, based on the average occupied volume of each point in the target point cloud, the sparsity level information of the target point cloud can be determined.

Further optionally, the determining the sparsity level information of the target point cloud based on a target volume corresponding to the target point cloud and the number of target points contained in the target point cloud includes:

dividing the target volume by the number of target points to obtain a first value; and determining the sparsity level information of the target point cloud based on a relationship between the first value and a predetermined threshold.

Here, the first value is used to indicate an average occupied volume of each point in the target point cloud, and the sparsity level information of the target point cloud is determined based on the relationship between the average occupied volume of each point in the target point cloud and the predetermined threshold.

Optionally, the determining the sparsity level information of the target point cloud based on a relationship between the first value and a predetermined threshold includes at least one of the following:

in a case that the first value is greater than the predetermined threshold, determining the sparsity level information of the target point cloud as sparse point cloud; or in a case that the first value is less than or equal to the predetermined threshold, determining the sparsity level information of the target point cloud as dense point cloud.

Here, in a case that the average occupied volume of each point in the target point cloud is greater than the predetermined threshold, the sparsity level information of the target point cloud is determined as sparse point cloud; and in a case that the average occupied volume of each point in the target point cloud is less than or equal to the predetermined threshold, the sparsity level information of the target point cloud is determined as dense point cloud.

In an embodiment of this application, first, magnitudes of the spatial block (bounding box) corresponding to the target point cloud in the x, y, and z dimensions are obtained, and a volume of the bounding box, that is, the foregoing target volume, is calculated based on the magnitudes in the x, y, and z dimensions, denoted as V. Then, the number of points in the target point cloud is obtained, denoted as N. Assuming that the foregoing first value is represented by P, then P=V÷N. After being obtained, P is compared with the predetermined threshold Th. Assuming that the comparison result is represented by variable S, the value of S is as follows:

$$S = \begin{cases} 1, & P > Th \\ 0, & P \le Th \end{cases}.$$

Figure 3:
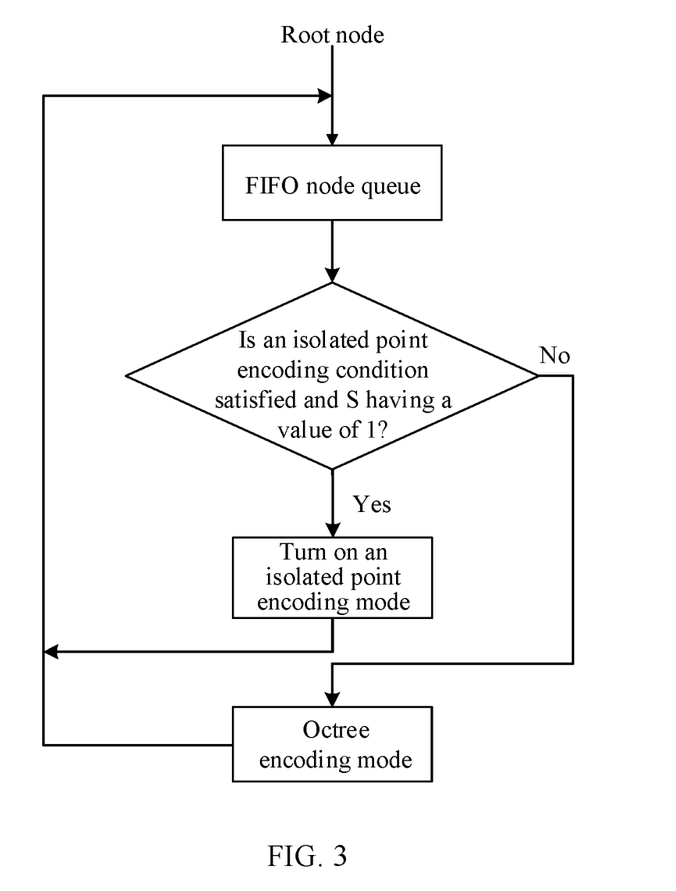
FIG. 3 is a second schematic flowchart of a point cloud encoding processing method according to an embodiment of this application.

After being obtained, the value of S is taken as a condition for enabling the isolated point encoding mode, as shown in FIG. 3 (assuming that the foregoing isolated point decoding condition includes three conditions). A first input first output (FIFO) node queue is obtained based on occupied nodes of the corresponding spatial block in the constructed tree structure. Only when the value of S is 1 and the foregoing isolated point encoding conditions are satisfied, will the isolated point encoding mode be activated. Otherwise, the octree encoding mode is activated.

Optionally, the method according to this embodiment of this application further includes:

adding the predetermined threshold or an index of the predetermined threshold to geometric header information; or adding the predetermined threshold or the index of the predetermined threshold to geometric slice header information; where the index of the predetermined threshold corresponds to a threshold in a list of predetermined thresholds, the list of predetermined thresholds including at least one threshold.

In this embodiment of this application, the foregoing predetermined threshold may be a threshold agreed in advance between the encoding side and the decoding side. In this case, the foregoing predetermined threshold may not be encoded. Alternatively, the foregoing predetermined threshold may also be a value predetermined by the encoding side. In this case, the encoding side encodes the predetermined threshold and adds it to the geometric header information (the foregoing target point cloud being a point cloud sequence) or to the geometric slice header information (the foregoing target point cloud being a point cloud slice). Alternatively, the foregoing predetermined threshold may be a threshold in a predetermined threshold list. The encoding side and the decoding side are provided with the same list of predetermined thresholds. The encoding side encodes the index of a predetermined threshold selected by the user from the list of predetermined thresholds and adds the encoded index of the predetermined threshold to the geometric header information (the foregoing target point cloud being a point cloud sequence) or to the geometric slice header information (the foregoing target point cloud being a point cloud slice) so that the decoding side decodes the index to obtain the corresponding predetermined threshold, and determines whether the target point cloud is a sparse point cloud based on the predetermined threshold.

Optionally, before the determining whether a target point cloud is a sparse point cloud, the method further includes:

obtaining the target volume and the number of target points based on geometric header information or geometric slice header information corresponding to the target point cloud.

In a case that the foregoing target point cloud is a point cloud sequence, the foregoing target volume and number of target points are obtained from the corresponding geometric header information; in a case that the foregoing target point cloud is a point cloud slice, the foregoing target volume and number of target points are obtained from the corresponding geometric slice header information.

Optionally, after the determining sparsity level information of a target point cloud, the method includes:

adding a first identifier to geometric header information or geometric slice header information corresponding to the target point cloud, the first identifier being used to indicate the sparsity level information of the target point cloud.

Specifically, the first identifier being set to a first value (for example, 1) indicates that the sparsity level information of the target point cloud is sparse point cloud; the first identifier being set to a second value (for example, 0) indicates that the sparsity level information of the target point cloud is dense point cloud.

Here, after determining that the sparsity level information of the target point cloud is sparse point cloud, the encoding side encodes the first identifier and adds the encoded first identifier to the geometric header information (the target point cloud being a point cloud sequence) or to the geometric slice header information (the target point cloud being a point cloud slice), so that the decoding side can determine the sparsity level information of the target point cloud directly based on the first identifier without the need of carrying out the determination of the sparsity level information.

It should be noted that there are two performance metrics for evaluating point cloud compression. One is distortion degree of the point cloud, where a higher distortion degree results in poorer objective quality of the reconstructed point cloud. The other is size of the bitstream after the compression. In lossless compression, there is no distortion in the point cloud, so that only the bitstream size after point cloud compression needs to be considered; while for lossy compression, both aspects need to be considered. For the two indicators, the bitstream size can be measured by the number of bits output after encoding, while the distortion degree of the point cloud is evaluated through two distortion evaluation algorithms provided by PCRM.

Typically, when assessing the performance of a compression algorithm, the rate-distortion (RD) curve is employed to compare the performance differences between two algorithms. The ideal goal of point cloud compression is to have a smaller bitstream and a higher peak signal-to-noise ratio (PSNR), which is a measure of the objective quality. However, this is rarely the case. In most cases, the bitstream becomes smaller when compared to the original method, but the PSNR, that is, the quality of the point cloud, decreases; or, the PSNR becomes higher, but the bitstream increases as well. To evaluate the performance of a new method in both cases, it is necessary to have a metric that comprehensively considers both the bitstream and PSNR. The AVS point cloud compression working group uses the bjontegaard-delta-rate (BD-Rate) as a comprehensive metric to evaluate the bit rate and objective quality of a point cloud compression algorithm and refines the metric into two aspects: BD-GeomRate and BD-AttrRate, corresponding to the geometry and attribute aspects, respectively. A negative value of BD-Rate indicates an increase in the performance of the new method when compared with the original method, while a positive value of BD-Rate indicates a decrease in the performance of the new method when compared with the original method. Depending on whether the error is a mean square error or a Hausdorff distance, there are two ways having two results to calculate PSNR, and the corresponding BD-Rate also has two results: denoted as D1 for calculation using a mean square error and D1-H for calculation using a Hausdorff distance. Table 1 shows the performance comparison results between the method of the embodiments of this application and PCRM V3.0 under lossy conditions. It can be seen that both BD-GeomRate calculated by using D1 and BD-GeomRate calculated by using D1-H are negative, indicating that the encoding performance can be effectively improved by using the method of the embodiments of this application.

TABLE 1

| Sequence | BD-GeomRate (D1) | BD-GeomRate (D1-H) |
| --- | --- | --- |
| bridge_1 mm | −0.1% | −0.1% |
| double_T_section_1 mm | −1.5% | −1.5% |
| intersection1_1 mm | −1.5% | −1.5% |
| intersection2_1 mm | −1.4% | −1.4% |
| straight_road_1 mm | −1.4% | −1.3% |
| T_section_1 mm | −0.8% | −0.8% |
| stanford_area_2_vox20 | −1.8% | −1.8% |
| stanford_area_4_vox20 | −1.2% | −1.2% |
| Church_vox16 | −1.0% | −1.0% |
| Courthouse_vox16 | −1.1% | −1.1% |
| Ignatius_vox11 | −0.4% | −0.4% |
| QQdog_vox15 | −1.0% | −0.9% |
| Truck_vox15 | −0.7% | −0.7% |
| ford_01 | −0.2% | −0.2% |
| ford_02 | −0.3% | −0.2% |
| livox_01_all | −0.3% | −0.3% |
| livox_02_all | −0.5% | −0.5% |
| basketball_player_vox11 | −0.9% | −0.9% |
| dancer_player_vox11 | −0.9% | −0.9% |
| exercise_vox11 | −0.6% | −0.5% |
| model_vox11 | −0.8% | −0.8% |

In this embodiment of this application, sparsity level information of the target point cloud is first determined, and then in a case that the sparsity level information indicates the target point cloud being a sparse point cloud, and the target point cloud satisfies an isolated point encoding condition, an isolated point encoding mode is enabled. In this way, through the foregoing sparsity level information and isolated point encoding condition, nodes that require isolated point encoding can be screened out quickly, thereby encoding performance is guaranteed effectively.

Figure 4:
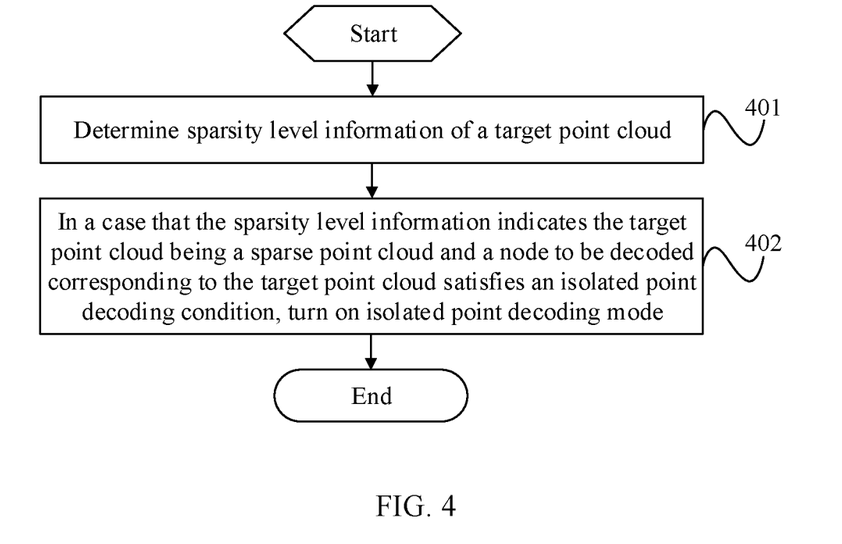
FIG. 4 is a schematic flowchart of a point cloud decoding processing method according to an embodiment of this application.

As shown in FIG. 4, an embodiment of this application further provides a point cloud decoding processing method, including the following steps:

Step 401: Determine sparsity level information of a target point cloud.

In this step, the foregoing target point cloud is a point cloud sequence or a point cloud slice (slice) in a point cloud sequence.

Here, the sparsity level information of the target point cloud is determined so as to facilitate the subsequent determination of whether an isolated point decoding mode is enabled based on the sparsity level information, that is, whether the isolated point decoding mode is enabled is determined by considering the specific characteristics of the target point cloud.

Step 402: In a case that the sparsity level information indicates the target point cloud being a sparse point cloud and a node to be decoded corresponding to the target point cloud satisfies an isolated point decoding condition, enable an isolated point decoding mode.

In an optional implementation, the isolated point decoding conditions include:

An isolated point direct decoding mode indicator in the geometric header information (the target point cloud being a point cloud sequence) or the geometric slice header information (the target point cloud being a point cloud slice) corresponding to the target point cloud is set to a second predetermined value, for example, 1; and a sum of Morton code bits to be decoded for second target points is greater than a third value multiplied by a predetermined factor (for example, 2), where the second target points include points within a spatial block corresponding to the current node being decoded in the target point cloud, the third value is the number of second target edge lengths in the spatial block corresponding to the current node being decoded, the second target edge lengths include edge lengths in a predetermined direction, and the second target edge lengths are smaller than a minimum edge length in the predetermined direction, where the predetermined direction includes at least one of the X direction, Y direction, or Z direction.

In this implementation, the isolated point decoding module includes decoding singlePointFlag, and decoding the geometric coordinates of the point within the spatial block corresponding to the current node being encoded in a case that singlePointFlag is set to 1.

In another optional implementation, the isolated point decoding conditions include:

An isolated point direct decoding mode indicator in the geometric header information (the target point cloud being a point cloud sequence) or the geometric slice header information (the target point cloud being a point cloud slice) corresponding to the target point cloud is set to a second predetermined value, for example, 1; and a sum of Morton code bits to be decoded for second target points is greater than a third value multiplied by a predetermined factor (for example, 2), where the second target points include points within a spatial block corresponding to the current node being decoded in the target point cloud, the third value is the number of second target edge lengths in the spatial block corresponding to the current node being decoded, the second target edge lengths include edge lengths in a predetermined direction, and the second target edge lengths are smaller than a minimum edge length in the predetermined direction, where the predetermined direction includes at least one of the X direction, the Y direction, or the Z direction; and there is only one point in the spatial block corresponding to the current node being decoded.

In this implementation, the isolated point decoding mode includes decoding the geometric coordinates of the point within the spatial block corresponding to the current node being decoded.

In the point cloud decoding processing method in this embodiment of this application, sparsity level information of the target point cloud is first determined, and then in a case that the sparsity level information indicates the target point cloud being a sparse point cloud and a node to be decoded corresponding to the target point cloud satisfies an isolated point decoding condition, an isolated point decoding mode is enabled. In this way, through the foregoing sparsity level information and isolated point decoding conditions, nodes suitable for isolated point decoding can be screened out quickly, thereby decoding performance is guaranteed effectively.

In a first optional implementation, the determining sparsity level information of a target point cloud includes:

determining the sparsity level information of the target point cloud based on a target volume corresponding to the target point cloud and the number of target points contained in the target point cloud.

The target volume corresponding to the foregoing target point cloud may be a volume of a spatial block corresponding to the target point cloud, such as a volume of a point cloud slice bounding box.

Here, based on the target volume corresponding to the target point cloud and the number of target points contained in the target point cloud, an average occupied volume of each point in the target point cloud can be obtained. Then, based on the average occupied volume of each point in the target point cloud, the sparsity level information of the target point cloud can be determined.

Optionally, the determining the sparsity level information of the target point cloud based on a target volume corresponding to the target point cloud and the number of target points contained in the target point cloud includes:

dividing the target volume by the number of target points to obtain a first value; and determining the sparsity level information of the target point cloud based on a relationship between the first value and a predetermined threshold.

Here, the first value is used to indicate an average occupied volume of each point in the target point cloud, and the sparsity level information of the target point cloud is determined based on the relationship between the average occupied volume of each point in the target point cloud and the predetermined threshold.

Optionally, the determining the sparsity level information of the target point cloud based on a relationship between the first value and a predetermined threshold includes at least one of the following:

in a case that the first value is greater than the predetermined threshold, determining the sparsity level information of the target point cloud as sparse point cloud; or in a case that the first value is less than or equal to the predetermined threshold, determining the sparsity level information of the target point cloud as dense point cloud.

Here, in a case that the average occupied volume of each point in the target point cloud is greater than the predetermined threshold, the sparsity level information of the target point cloud is determined as sparse point cloud; and in a case that the average occupied volume of each point in the target point cloud is less than or equal to the predetermined threshold, the sparsity level information of the target point cloud is determined as dense point cloud.

In an embodiment of this application, first, magnitudes of the spatial block (bounding box) corresponding to the target point cloud in the x, y, and z dimensions are obtained, and a volume of the bounding box, that is, the foregoing target volume, is calculated based on the magnitudes in the x, y, and z dimensions, denoted as V. Then, the number of points in the target point cloud is obtained, denoted as N. Assuming that the foregoing first value is represented by P, then P=V÷N. After being obtained, P is compared with the predetermined threshold Th. Assuming that the comparison result is represented by variable S, the value of S is as follows:

$$S = \begin{cases} 1, & P > Th \\ 0, & P \leq Th \end{cases};$$

where

After being obtained, the value of S is taken as a condition for enabling the isolated point decoding mode. Only when the value of S is 1 and the foregoing isolated point decoding condition is satisfied, will the isolated point decoding mode be activated. Otherwise, the octree decoding mode is activated.

Optionally, before the determining the sparsity level information of the target point cloud based on a relationship between the first value and a predetermined threshold, the method further includes:

obtaining the predetermined threshold or an index of the predetermined threshold from geometric header information corresponding to the target point cloud; or obtaining the predetermined threshold or an index of the predetermined threshold from geometric slice header information corresponding to the target point cloud; where the index of the predetermined threshold corresponds to a threshold in a list of predetermined thresholds, the list of predetermined thresholds including at least one threshold.

In this embodiment of this application, the foregoing predetermined threshold may be a threshold agreed in advance between the encoding side and the decoding side. Alternatively, the foregoing predetermined threshold may be a value predetermined by the encoding side. In this case, the encoding side encodes the predetermined threshold and adds it to the geometric header information (the foregoing target point cloud being a point cloud sequence) or to the geometric slice header information (the foregoing target point cloud being a point cloud slice), and the decoding side decodes the geometric header information or the geometric slice header information to obtain the predetermined threshold. Alternatively, the foregoing predetermined threshold may be a threshold in a list of predetermined thresholds. The encoding side and the decoding side are provided with the same list of predetermined thresholds. The encoding side encodes the index of a predetermined threshold selected by the user from the list of predetermined thresholds and adds the encoded index of the predetermined threshold to the geometric header information (the foregoing target point cloud being a point cloud sequence) or to the geometric slice header information (the foregoing target point cloud being a point cloud slice). The decoding side decodes the index to obtain the corresponding predetermined threshold, and determines whether the target point cloud is a sparse point cloud based on the predetermined threshold.

Optionally, before the determining whether a target point cloud is a sparse point cloud, the method further includes:
obtaining the target volume and the number of target points based on geometric header information or geometric slice header information corresponding to the target point cloud.

In a case that the foregoing target point cloud is a point cloud sequence, the foregoing target volume and number of target points are obtained from the corresponding geometric header information; in a case that the foregoing target point cloud is a point cloud slice, the foregoing target volume and number of target points are obtained from the corresponding geometric slice header information.

In a second optional implementation, the determining sparsity level information of a target point cloud includes:
in a case that a first identifier exists in geometric header information or geometric slice header information corresponding to the target point cloud, determining the sparsity level information of the target point cloud based on the first identifier.

Specifically, the first identifier being set to a first value (for example, 1) indicates that the sparsity level information of the target point cloud is sparse point cloud; the first identifier being set to a second value (for example, 0) indicates that the sparsity level information of the target point cloud is dense point cloud.

In this implementation, the decoding side can determine whether the sparsity level information of the target point cloud is sparse point cloud or a dense point cloud by decoding the first identifier directly, without the need to determine the sparsity level information based on the target volume and the number of target points of the target point cloud.

In the point cloud decoding processing method in this embodiment of this application, sparsity level information of the target point cloud is first determined, and then in a case that the sparsity level information indicates the target point cloud being a sparse point cloud and a node to be decoded corresponding to the target point cloud satisfies an isolated point decoding condition, an isolated point decoding mode is enabled. In this way, through the foregoing sparsity level information and isolated point decoding conditions, nodes suitable for isolated point decoding can be screened out quickly, thereby decoding performance is guaranteed effectively.

It should be noted that, for the point cloud encoding processing method provided in the embodiments of this application, the execution body may be a point cloud encoding processing apparatus, or a control module for executing the point cloud encoding processing method in the point cloud encoding processing apparatus. In the embodiments of this application, the point cloud encoding processing apparatus provided by the embodiments of this application is described by using the point cloud encoding processing method being executed by the point cloud encoding processing apparatus as an example.

Figure 5:
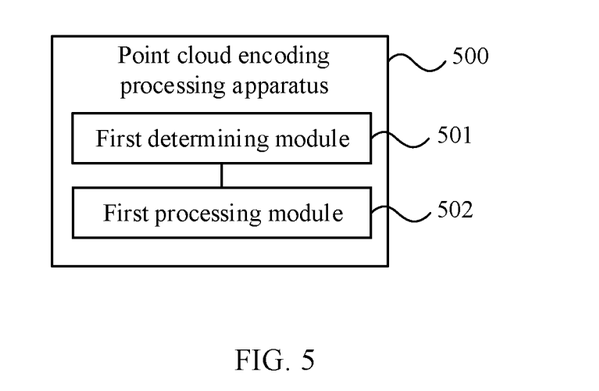
FIG. 5 is a schematic modular diagram of a point cloud encoding processing apparatus according to an embodiment of this application.

As shown in FIG. 5, an embodiment of this application further provides a point cloud encoding processing apparatus 500, including:
a first determining module 501, configured to determine sparsity level information of a target point cloud; and
a first processing module 502, configured to enable an isolated point encoding mode in a case that the sparsity level information indicates the target point cloud being a sparse point cloud and a node to be encoded corresponding to the target point cloud satisfies an isolated point encoding condition.

Optionally, the first determining module is configured to determine the sparsity level information of the target point cloud based on a target volume corresponding to the target point cloud and the number of target points contained in the target point cloud.

Optionally, the first determining module includes:
a first determining submodule, configured to divide the target volume by the number of target points to obtain a first value; and
a second determining submodule, configured to determine the sparsity level information of the target point cloud based on a relationship between the first value and a predetermined threshold.

Optionally, the second determining submodule is configured to execute at least one of the following:
in a case that the first value is greater than the predetermined threshold, determining the sparsity level information of the target point cloud as sparse point cloud; or
in a case that the first value is less than or equal to the predetermined threshold, determining the sparsity level information of the target point cloud as dense point cloud.

Optionally, the apparatus according to this embodiment of this application further includes:
a first encoding module, configured to add the predetermined threshold or an index of the predetermined threshold to geometric header information; or
adding the predetermined threshold or the index of the predetermined threshold to geometric slice header information; where
the index of the predetermined threshold corresponds to a threshold in a list of predetermined thresholds, the list of predetermined thresholds including at least one threshold.

Optionally, the apparatus according to this embodiment of this application further includes:
a first obtaining module, configured to obtain the target volume and the number of target points based on geometric header information or geometric slice header information corresponding to a target point cloud before the first determining module determines whether the target point cloud is a sparse point cloud.

Optionally, the apparatus according to this embodiment of this application further includes:
a second encoding module, configured to add a first identifier to geometric header information or geometric slice header information corresponding to a target point cloud after the first determining module determines the sparsity level information of the target point cloud, the first identifier being used to indicate the sparsity level information of the target point cloud.

Optionally, the target point cloud is a point cloud sequence or a point cloud slice in the point cloud sequence.

In the embodiments of this application, sparsity level information of the target point cloud is first determined, and then in a case that the sparsity level information indicates the target point cloud being a sparse point cloud and a node to be decoded corresponding to the target point cloud satisfies an isolated point decoding condition, an isolated point decoding mode is enabled. In this way, through the foregoing sparsity level information and isolated point decoding conditions, nodes suitable for isolated point decoding can be screened out quickly, thereby decoding performance is guaranteed effectively.

The point cloud encoding processing apparatus in this embodiment of this application may be an apparatus or an apparatus or electronic device having an operating system, or may be a component, an integrated circuit, or a chip in a terminal. The apparatus or electronic device may be a mobile terminal or a non-mobile terminal.

The point cloud encoding processing apparatus provided in this embodiment of this application is capable of implementing the processes implemented in the method embodiments in FIG. 2 and FIG. 3, with the same technical effects achieved. To avoid repetition, details are not described herein again.

Figure 6:
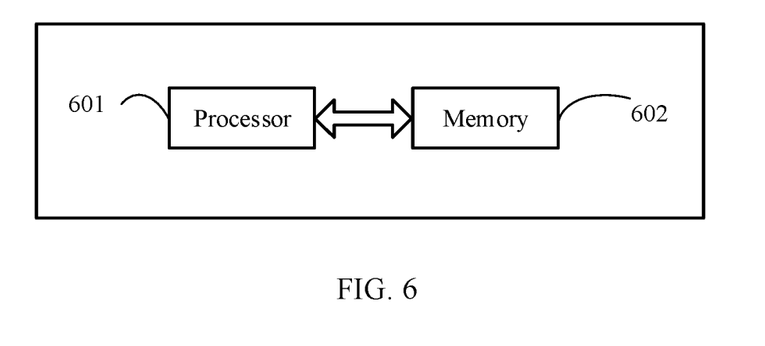
FIG. 6 is a first structural block diagram of a point cloud encoding processing apparatus according to an embodiment of this application.

Optionally, as shown in FIG. 6, an embodiment of this application further provides a point cloud encoding processing apparatus, including a processor 601, a memory 602, and a program or instructions stored in the memory 602 and capable of running on the processor 601, where when the program or instructions are executed by the processor 601, the processes of the foregoing point cloud encoding processing method embodiment are implemented, with the same technical effects achieved. To avoid repetition, details are not further described herein.

An embodiment of this application further provides a point cloud encoding processing apparatus, including a processor and a communication interface, where the processor is configured to determine sparsity level information of a target point cloud; and in a case that the sparsity level information indicates the target point cloud being a sparse point cloud and a node to be encoded corresponding to the target point cloud satisfies an isolated point encoding condition, an isolated point encoding mode is enabled.

Figure 7:
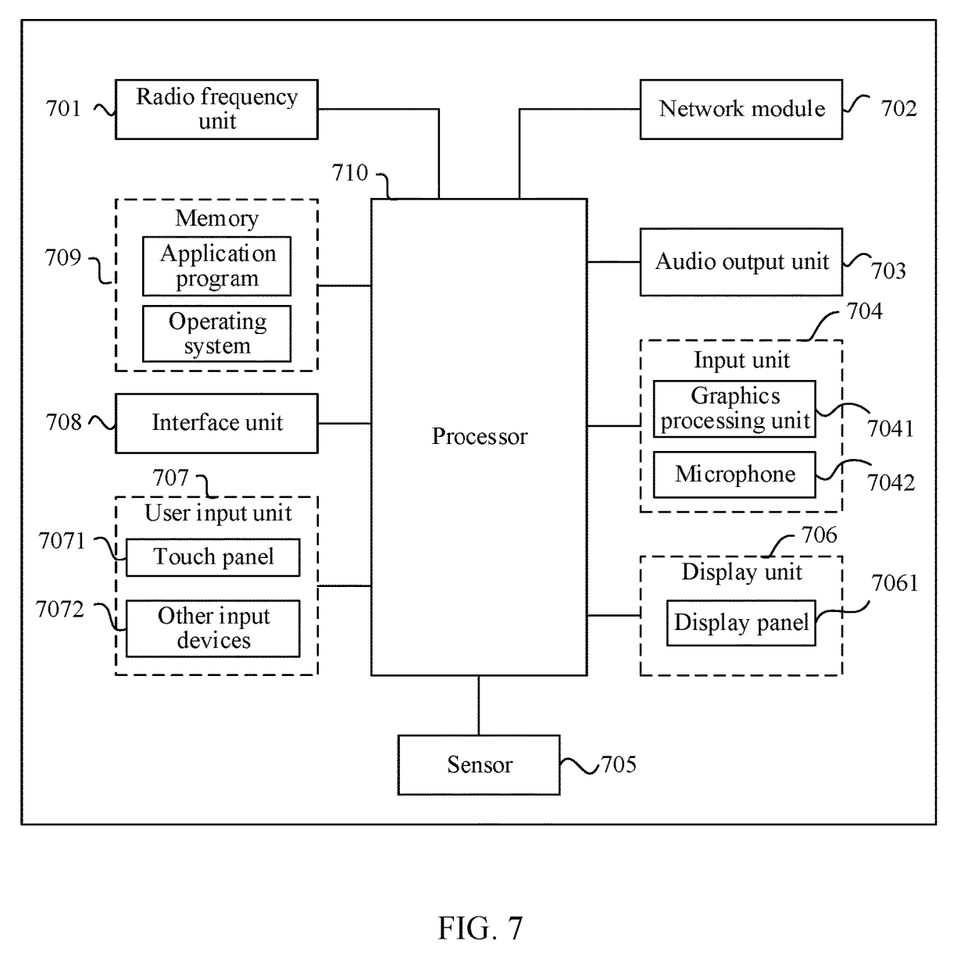
FIG. 7 is a second structural block diagram of a point cloud encoding processing apparatus according to an embodiment of this application.

FIG. 7 is a schematic diagram of hardware structure of a point cloud encoding processing apparatus for implementing the embodiments of this application. The point cloud encoding processing apparatus includes but is not limited to at least some of components such as a radio frequency unit 701, a network module 702, an audio output unit 703, an input unit 704, a sensor 705, a display unit 706, a user input unit 707, an interface unit 708, a memory 709, and a processor 710.

Persons skilled in the art can understand that the point cloud encoding processing apparatus 700 may further include a power supply (for example, a battery) supplying power to the components, and the power supply may be logically connected to the processor 710 through a power management system. In this way, functions such as charge management, discharge management, and power consumption management are implemented by using the power management system. The structure shown in FIG. 7 does not constitute any limitation on the point cloud encoding processing apparatus. The point cloud encoding processing apparatus may include more or fewer components than shown in the figure, or a combination of some components, or the components disposed differently. Details are not described herein again.

It should be understood that in this embodiment of this application, the input unit 704 may include a graphics processing unit (GPU) 7041 and a microphone 7042. The graphics processing unit 7041 processes image data of a static picture or a video that is obtained by an image capture apparatus (for example, a camera) in a video capture mode or an image capture mode. The display unit 706 may include a display panel 7061. The display panel 7061 may be configured in a form of a liquid crystal display, an organic light-emitting diode display, or the like. The user input unit 707 includes a touch panel 7071 and other input devices 7072. The touch panel 7071 is also referred to as a touch-screen. The touch panel 7071 may include two parts: a touch detection apparatus and a touch controller. The other input devices 7072 may include but are not limited to a physical keyboard, a function button (for example, a volume control button or a power on/off button), a trackball, a mouse, and a joystick. Details are not described herein.

In embodiments of this application, generally, the radio frequency unit 701 includes but is not limited to an antenna, at least one amplifier, a transceiver, a coupler, a low noise amplifier, and a duplexer.

The memory 709 may be configured to store software programs or instructions and various data. The memory 709 may include a program or instruction storage area and a data storage area. The program or instruction storage area may store an operating system, an application program or instruction required by at least one function (for example, a sound playback function or an image playback function), and the like. In addition, the memory 709 may include a high-speed random access memory, and may further include a non-volatile memory, where the non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory, for example, at least one disk storage device, flash memory device, or other volatile solid-state storage device.

The processor 710 may include one or more processing units. Optionally, an application processor and a modem processor may be integrated in the processor 710. The application processor primarily processes an operating system, user interfaces, application programs or instructions, and the like. The modem processor primarily processes radio communication, for example, being a baseband processor. It can be understood that the modem processor may alternatively be not integrated in the processor 710.

Optionally, the processor 710 is configured to determine sparsity level information of a target point cloud; and enable an isolated point encoding mode in a case that the sparsity level information indicates the target point cloud being a sparse point cloud and a node to be encoded corresponding to the target point cloud satisfies an isolated point encoding condition.

Optionally, the processor 710 is configured to determine the sparsity level information of the target point cloud based on a target volume corresponding to the target point cloud and the number of target points contained in the target point cloud.

Optionally, the processor 710 is configured to divide the target volume by the number of target points to obtain a first value; and
    determining the sparsity level information of the target point cloud based on a relationship between the first value and a predetermined threshold.

Optionally, the processor 710 is configured to perform at least one of the following:

in a case that the first value is greater than the predetermined threshold, determining the sparsity level information of the target point cloud as sparse point cloud; or in a case that the first value is less than or equal to the predetermined threshold, determining the sparsity level information of the target point cloud as dense point cloud.

Optionally, the processor 710 is configured to add the predetermined threshold or an index of the predetermined threshold to geometric header information; or adding the predetermined threshold or the index of the predetermined threshold to geometric slice header information; where the index of the predetermined threshold corresponds to a threshold in a list of predetermined thresholds, the list of predetermined thresholds including at least one threshold.

Optionally, the processor 710 is configured to obtain the target volume and the number of target points based on geometric header information or geometric slice header information corresponding to a target point cloud before determining whether the target point cloud is a sparse point cloud.

Optionally, the processor 710 is configured to add a first identifier to geometric header information or geometric slice header information corresponding to a target point cloud after determining the sparsity level information of the target point cloud, the first identifier being used to indicate the sparsity level information of the target point cloud.

Optionally, the target point cloud is a point cloud sequence or a point cloud slice in the point cloud sequence.

In the point cloud encoding processing apparatus in this embodiment of this application, sparsity level information of the target point cloud is first determined, and then in a case that the sparsity level information indicates the target point cloud being a sparse point cloud and the target point cloud satisfies an isolated point encoding condition, an isolated point encoding mode is enabled. In this way, through the foregoing sparsity level information and isolated point encoding condition, nodes suitable for isolated point encoding can be screened out quickly, thereby encoding performance is guaranteed effectively.

It should be noted that, for the point cloud decoding processing method provided in the embodiments of this application, the execution body may be a point cloud decoding processing apparatus, or a control module for executing the point cloud decoding processing method in the point cloud decoding processing apparatus. In the embodiments of this application, the point cloud decoding processing apparatus provided by the embodiments of this application is described by using the point cloud decoding processing method being executed by the point cloud decoding processing apparatus as an example.

Figure 8:
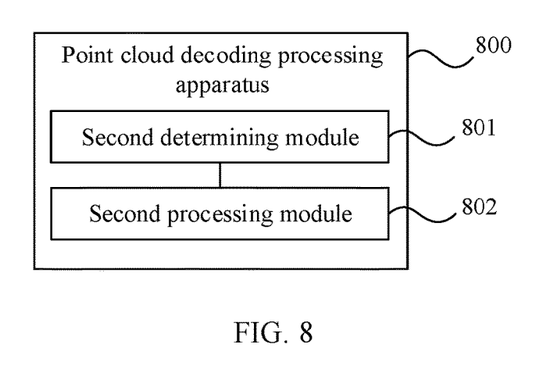
FIG. 8 is a schematic modular diagram of a point cloud decoding processing apparatus according to an embodiment of this application.

As shown in FIG. 8, an embodiment of this application further provides a point cloud decoding processing apparatus 800, including:

a second determining module 801, configured to determine sparsity level information of a target point cloud; and a second processing module 802, configured to enable an isolated point decoding mode in a case that the sparsity level information indicates the target point cloud being a sparse point cloud and a node to be decoded corresponding to the target point cloud satisfies an isolated point decoding condition.

Optionally, the second determining module is configured to determine the sparsity level information of the target point cloud based on a target volume corresponding to the target point cloud and the number of target points contained in the target point cloud.

Optionally, the second determining module includes:

a third determining submodule, configured to divide the target volume by the number of target points to obtain a first value; and a fourth determining submodule, configured to determine the sparsity level information of the target point cloud based on a relationship between the first value and a predetermined threshold.

Optionally, the fourth determining submodule is configured to execute at least one of the following:

in a case that the first value is greater than the predetermined threshold, determining the sparsity level information of the target point cloud as sparse point cloud; or in a case that the first value is less than or equal to the predetermined threshold, determining the sparsity level information of the target point cloud as dense point cloud.

Optionally, the apparatus according to this embodiment of this application further includes:

a second obtaining module configured to, before the fourth determining submodule determines the sparsity level information of the target point cloud based on a relationship between the first value and a predetermined threshold, obtain the predetermined threshold or an index of the predetermined threshold in the geometric header information corresponding to the target point cloud; or, obtain the predetermined threshold or an index of the predetermined threshold in the geometric slice header information corresponding to the target point cloud; where the index of the predetermined threshold corresponds to a threshold in a list of predetermined thresholds, the list of predetermined thresholds including at least one threshold.

Optionally, the apparatus according to this embodiment of this application further includes:

a third obtaining module, configured to obtain the target volume and the number of target points based on geometric header information or geometric slice header information corresponding to a target point cloud before the second determining module determines whether the target point cloud is a sparse point cloud.

Optionally, the second determining module is configured to, in a case that a first identifier exists in geometric header information or geometric slice header information corresponding to the target point cloud, determine the sparsity level information of the target point cloud based on the first identifier.

Optionally, the target point cloud is a point cloud sequence or a point cloud slice in the point cloud sequence.

In the point cloud decoding processing apparatus in this embodiment of this application, sparsity level information of the target point cloud is first determined, and then in a case that the sparsity level information indicates the target point cloud being a sparse point cloud and the target point cloud satisfies an isolated point decoding condition, an isolated point decoding mode is enabled. In this way, through the foregoing sparsity level information and isolated point decoding conditions, nodes suitable for isolated point decoding can be screened out quickly, thereby decoding performance is guaranteed effectively.

The point cloud decoding processing apparatus in this embodiment of this application may be an apparatus or an apparatus or electronic device having an operating system, or may be a component, an integrated circuit, or a chip in a terminal. The apparatus or electronic device may be a mobile terminal or a non-mobile terminal.

The point cloud decoding processing apparatus provided in this embodiment of this application is capable of implementing the processes implemented in the method embodiments in FIG. 4, with the same technical effects achieved. To avoid repetition, details are not described herein again.

Optionally, an embodiment of this application further provides a point cloud decoding processing apparatus (refer to FIG. 6 for its schematic structural diagram), including a processor, a memory, and a program or instructions stored in the memory and capable of running on the processor, where when the program or instructions are executed by the processor, the processes of the foregoing point cloud decoding processing method embodiment are implemented, with the same technical effects achieved. To avoid repetition, details are not further described herein.

An embodiment of this application further provides a point cloud decoding processing apparatus, including a processor and a communication interface, where the processor is configured to determine sparsity level information of a target point cloud; and in a case that the sparsity level information indicates the target point cloud being a sparse point cloud and a node to be decoded corresponding to the target point cloud satisfies an isolated point decoding condition, an isolated point decoding mode is enabled.

An embodiment of this application further provides a point cloud decoding processing apparatus. Refer to FIG. 7 for a schematic diagram of its hardware structure. The point cloud decoding processing apparatus includes but is not limited to at least some of components such as a radio frequency unit, a network module, an audio output unit, an input unit, a sensor, a display unit, a user input unit, an interface unit, a memory, and a processor.

Persons skilled in the art can understand that the point cloud decoding processing apparatus may further include a power supply (for example, a battery) supplying power to the components, and the power supply may be logically connected to the processor through a power management system. In this way, functions such as charge management, discharge management, and power consumption management are implemented by using the power management system. The structure shown in FIG. 7 does not constitute any limitation on the point cloud decoding processing apparatus. The point cloud decoding processing apparatus may include more or fewer components than shown in the figure, or a combination of some components, or the components disposed differently. Details are not described herein again.

It should be understood that in this embodiment of this application, the input unit may include a graphics processing unit (GPU) and a microphone. The graphics processing unit processes image data of a static picture or a video that is obtained by an image capture apparatus (for example, a camera) in a video capture mode or an image capture mode. The display unit may include a display panel, and the display panel may be configured in a form of a liquid crystal display, an organic light-emitting diode, or the like. The user input unit includes a touch panel and other input devices. The touch panel is also referred to as a touchscreen. The touch panel may include two parts: a touch detection apparatus and a touch controller. The other input devices may include but are not limited to a physical keyboard, a functional button (such as a volume control button or a power on/off button), a trackball, a mouse, and a joystick. Details are not described herein.

In embodiments of this application, generally, the radio frequency unit includes but is not limited to an antenna, at least one amplifier, a transceiver, a coupler, a low noise amplifier, and a duplexer.

The memory may be configured to store software programs or instructions and various data. The memory may include a program or instruction storage area and a data storage area. The program or instruction storage area may store an operating system, an application program or instruction required by at least one function (for example, a sound playback function or an image playback function), and the like. In addition, the memory may include a high-speed random access memory, and may further include a non-volatile memory, where the non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory, for example, at least one disk storage device, flash memory device, or other volatile solid-state storage device.

The processor may include one or more processing units. Optionally, an application processor and a modem processor may be integrated in the processor. The application processor primarily processes an operating system, user interfaces, application programs or instructions, and the like. The modem processor primarily processes radio communication, for example, being a baseband processor. It can be understood that the modem processor may alternatively be not integrated in the processor.

Optionally, the processor is configured to determine sparsity level information of a target point cloud; and enable an isolated point decoding mode in a case that the sparsity level information indicates the target point cloud being a sparse point cloud and a node to be decoded corresponding to the target point cloud satisfies an isolated point decoding condition.

Optionally, the processor is configured to determine the sparsity level information of the target point cloud based on a target volume corresponding to the target point cloud and the number of target points contained in the target point cloud.

Optionally, the processor is configured to divide the target volume by the number of target points to obtain a first value; and determine the sparsity level information of the target point cloud based on a relationship between the first value and a predetermined threshold.

Optionally, the processor is configured to perform at least one of the following:
  in a case that the first value is greater than the predetermined threshold, determining the sparsity level information of the target point cloud as sparse point cloud; or
  in a case that the first value is less than or equal to the predetermined threshold, determining the sparsity level information of the target point cloud as dense point cloud.

Optionally, the processor is configured to, before determining the sparsity level information of the target point cloud based on a relationship between the first value and a predetermined threshold, obtain the predetermined threshold or an index of the predetermined threshold in the geometric header information corresponding to the target point cloud; or, obtain the predetermined threshold or an index of the predetermined threshold in the geometric slice header information corresponding to the target point cloud; where
the index of the predetermined threshold corresponds to a threshold in a list of predetermined thresholds, the list of predetermined thresholds including at least one threshold.

Optionally, the processor is configured to obtain the target volume and the number of target points based on geometric header information or geometric slice header information corresponding to a target point cloud before determining whether the target point cloud is a sparse point cloud.

Optionally, the processor is configured to, in a case that a first identifier exists in geometric header information or geometric slice header information corresponding to the target point cloud, determine the sparsity level information of the target point cloud based on the first identifier.

Optionally, the target point cloud is a point cloud sequence or a point cloud slice in the point cloud sequence.

In the point cloud decoding processing apparatus in this embodiment of this application, sparsity level information of the target point cloud is first determined, and then in a case that the sparsity level information indicates the target point cloud being a sparse point cloud and the target point cloud satisfies an isolated point decoding condition, an isolated point decoding mode is enabled. In this way, through the foregoing sparsity level information and isolated point decoding conditions, nodes suitable for isolated point decoding can be screened out quickly, thereby decoding performance is guaranteed effectively.

An embodiment of the present invention further provides a readable storage medium, where a program or an instruction is stored in the readable storage medium. When the program or instruction is executed by a processor, the processes of the foregoing point cloud encoding processing method or the point cloud decoding processing method embodiment can be implemented, with same technical effects achieved. To avoid repetition, details are not described herein again.

The processor is a processor in the point cloud encoding processing apparatus or point cloud decoding processing apparatus described in the foregoing embodiment. The readable storage medium includes a computer-readable storage medium, such as a computer read-only memory (ROM), a random access memory (RAM), a magnetic disk, or an optical disc.

Another embodiment of this application provides a chip, where the chip includes a processor and a communication interface, the communication interface is coupled to the processor, and the processor is configured to run a program or instructions to implement the processes of the foregoing point cloud decoding processing method or point cloud encoding processing method embodiments, with the same technical effects achieved. To avoid repetition, details are not described herein again.

It should be understood that the chip mentioned in the embodiments of this application may also be referred to as a system-level chip, a system chip, a chip system, a system-on-chip, or the like.

An embodiment of this application further provides a computer program product, where the computer program product is stored in a non-transitory storage medium. When the computer program product is executed by at least one processor, the processes of the foregoing point cloud encoding processing method or point cloud decoding processing embodiment are implemented, with the same technical effects achieved. To avoid repetition, details are not described herein again.

It should be noted that in this specification, the terms "include" and "comprise", or any of their variants are intended to cover a non-exclusive inclusion, such that a process, method, article, or apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element. Furthermore, it should be noted that the scope of the methods and apparatuses in the embodiments of this application is not limited to performing the functions in the order shown or discussed, but may also include performing the functions in a substantially simultaneous manner or in a reverse order depending on the functions involved. For example, the described method may be performed in an order different from the order described, and steps may be added, omitted, or combined. In addition, features described with reference to some examples may be combined in other examples.

According to the description of the foregoing implementations, persons skilled in the art can clearly understand that the method in the foregoing embodiments may be implemented by software in combination with a necessary general hardware platform. Certainly, the method in the foregoing embodiments may alternatively be implemented by hardware. However, in many cases, the former is a preferred implementation. Based on such an understanding, the technical solutions of this application essentially, or the part contributing to the prior art may be implemented in a form of a computer software product. The computer software product is stored in a storage medium (for example, a ROM/RAM, a magnetic disk, or an optical disc), and includes several instructions for instructing a terminal (which may be a mobile phone, a computer, a server, a network device, or the like) to perform the method described in the embodiments of this application.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. A point cloud encoding processing method, comprising:
    determining sparsity level information of a target point cloud; and
    in a case that the sparsity level information indicates the target point cloud being a sparse point cloud and a node to be encoded corresponding to the target point cloud satisfies an isolated point encoding condition, enabling an isolated point encoding mode;
    wherein the determining sparsity level information of a target point cloud comprises:
    determining the sparsity level information of the target point cloud based on a target volume corresponding to the target point cloud and the number of target points contained in the target point cloud;
    wherein the determining the sparsity level information of the target point cloud based on a target volume corresponding to the target point cloud and the number of target points contained in the target point cloud comprises:
dividing the target volume by the number of target points to obtain a first value; and
determining the sparsity level information of the target point cloud based on a relationship between the first value and a predetermined threshold.

2. The method according to claim 1, wherein the determining the sparsity level information of the target point cloud based on a relationship between the first value and a predetermined threshold comprises at least one of the following:
in a case that the first value is greater than the predetermined threshold, determining the sparsity level information of the target point cloud as sparse point cloud; or
in a case that the first value is less than or equal to the predetermined threshold, determining the sparsity level information of the target point cloud as dense point cloud.

3. The method according to claim 1, further comprising:
adding the predetermined threshold or an index of the predetermined threshold to geometric header information; or
adding the predetermined threshold or the index of the predetermined threshold to geometric slice header information; wherein
the index of the predetermined threshold corresponds to a threshold in a list of predetermined thresholds, the list of predetermined thresholds comprising at least one threshold.

4. The method according to claim 1, wherein before the determining whether a target point cloud is a sparse point cloud, the method further comprises:
obtaining the target volume and the number of target points based on geometric header information or geometric slice header information corresponding to the target point cloud.

5. The method according to claim 1, wherein after determining the sparsity level information of the target point cloud, the method further comprises:
adding a first identifier to geometric header information or geometric slice header information corresponding to the target point cloud, the first identifier being used to indicate the sparsity level information of the target point cloud.

6. The method according to claim 1, wherein the target point cloud is a point cloud sequence or a point cloud slice in a point cloud sequence.

7. A point cloud encoding processing apparatus, comprising a processor, a memory, and a program or instructions stored in the memory and capable of running on the processor, wherein when the program or instructions are executed by the processor, the steps of the point cloud encoding processing method according to claim 1 are implemented.

8. A non-transitory readable storage medium, wherein the non-transitory readable storage medium stores a program or instructions, and when the program or instructions are executed by the processor, the steps of the point cloud encoding processing method according to claim 1 are implemented.

9. A point cloud decoding processing method, comprising:
determining sparsity level information of a target point cloud; and
in a case that the sparsity level information indicates the target point cloud being a sparse point cloud and a node to be decoded corresponding to the target point cloud satisfies an isolated point decoding condition, enabling an isolated point decoding mode;
wherein the determining sparsity level information of a target point cloud comprises:
determining the sparsity level information of the target point cloud based on a target volume corresponding to the target point cloud and the number of target points contained in the target point cloud;
wherein the determining the sparsity level information of the target point cloud based on a target volume corresponding to the target point cloud and the number of target points contained in the target point cloud comprises:
dividing the target volume by the number of target points to obtain a first value; and
determining the sparsity level information of the target point cloud based on a relationship between the first value and a predetermined threshold.

10. The method according to claim 9, wherein the determining the sparsity level information of the target point cloud based on a relationship between the first value and a predetermined threshold comprises at least one of the following:
in a case that the first value is greater than the predetermined threshold, determining the sparsity level information of the target point cloud as sparse point cloud; or
in a case that the first value is less than or equal to the predetermined threshold, determining the sparsity level information of the target point cloud as dense point cloud.

11. The method according to claim 9, wherein before the determining the sparsity level information of the target point cloud based on a relationship between the first value and a predetermined threshold, the method further comprises:
obtaining the predetermined threshold or an index of the predetermined threshold from geometric header information corresponding to the target point cloud; or
obtaining the predetermined threshold or an index of the predetermined threshold from geometric slice header information corresponding to the target point cloud; wherein
the index of the predetermined threshold corresponds to a threshold in a list of predetermined thresholds, the list of predetermined thresholds comprising at least one threshold.

12. The method according to claim 9, wherein before the determining whether a target point cloud is a sparse point cloud, the method further comprises:
obtaining the target volume and the number of target points based on geometric header information or geometric slice header information corresponding to the target point cloud.

13. The method according to claim 9, wherein the determining sparsity level information of a target point cloud comprises:
in a case that a first identifier exists in geometric header information or geometric slice header information corresponding to the target point cloud, determining the sparsity level information of the target point cloud based on the first identifier.

14. The method according to claim 9, wherein the target point cloud is a point cloud sequence or a point cloud slice in a point cloud sequence.

15. A point cloud decoding processing apparatus, comprising a processor, a memory, and a program or instructions stored in the memory and capable of running on the processor, wherein the program or instructions, when executed by the processor, cause the point cloud decoding processing apparatus to implement:

determining sparsity level information of a target point cloud; and in a case that the sparsity level information indicates the target point cloud being a sparse point cloud and a node to be decoded corresponding to the target point cloud satisfies an isolated point decoding condition, enabling an isolated point decoding mode;

wherein the determining sparsity level information of a target point cloud comprises:

determining the sparsity level information of the target point cloud based on a target volume corresponding to the target point cloud and the number of target points contained in the target point cloud;

wherein the determining the sparsity level information of the target point cloud based on a target volume corresponding to the target point cloud and the number of target points contained in the target point cloud comprises:

dividing the target volume by the number of target points to obtain a first value; and determining the sparsity level information of the target point cloud based on a relationship between the first value and a predetermined threshold.

16. The point cloud decoding processing apparatus according to claim 15, wherein the determining the sparsity level information of the target point cloud based on a relationship between the first value and a predetermined threshold comprises at least one of the following:

in a case that the first value is greater than the predetermined threshold, determining the sparsity level information of the target point cloud as sparse point cloud; or in a case that the first value is less than or equal to the predetermined threshold, determining the sparsity level information of the target point cloud as dense point cloud.

17. The point cloud decoding processing apparatus according to claim 15, wherein before the determining the sparsity level information of the target point cloud based on a relationship between the first value and a predetermined threshold, the program or instructions, when executed by the processor, further cause the point cloud decoding processing apparatus to implement:

obtaining the predetermined threshold or an index of the predetermined threshold from geometric header information corresponding to the target point cloud; or obtaining the predetermined threshold or an index of the predetermined threshold from geometric slice header information corresponding to the target point cloud; wherein the index of the predetermined threshold corresponds to a threshold in a list of predetermined thresholds, the list of predetermined thresholds comprising at least one threshold.

18. The point cloud decoding processing apparatus according to claim 15, wherein before the determining whether a target point cloud is a sparse point cloud, the program or instructions, when executed by the processor, further cause the point cloud decoding processing apparatus to implement:

obtaining the target volume and the number of target points based on geometric header information or geometric slice header information corresponding to the target point cloud.

19. The point cloud decoding processing apparatus according to claim 15, wherein the determining sparsity level information of a target point cloud comprises:

in a case that a first identifier exists in geometric header information or geometric slice header information corresponding to the target point cloud, determining the sparsity level information of the target point cloud based on the first identifier.

20. The point cloud decoding processing apparatus according to claim 15, wherein the target point cloud is a point cloud sequence or a point cloud slice in a point cloud sequence.

* * * * *